US008390885B2

(12) United States Patent
Liu et al.

(10) Patent No.: US 8,390,885 B2
(45) Date of Patent: Mar. 5, 2013

(54) METHODS AND SYSTEM FOR IMPROVED COLOR CHARACTERIZATION

(75) Inventors: Juan Liu, Milpitas, CA (US); Haitham Hindi, Menlo Park, CA (US); Lalit Keshav Mestha, Fairport, NY (US); Kenneth J. Mihalyov, Webster, NY (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 749 days.

(21) Appl. No.: 12/557,994

(22) Filed: Sep. 11, 2009

(65) Prior Publication Data

US 2011/0063631 A1 Mar. 17, 2011

(51) Int. Cl.
*H04N 1/60* (2006.01)
(52) U.S. Cl. .................... 358/1.9; 375/240.18; 375/243; 375/245
(58) Field of Classification Search ........... 358/518–535
See application file for complete search history.

(56) References Cited

U.S. PATENT DOCUMENTS

| 5,305,119 | A | 4/1994 | Rolleston et al. |
| 5,528,386 | A | 6/1996 | Rolleston et al. |
| 5,612,902 | A | 3/1997 | Stokes |
| 5,818,960 | A | 10/1998 | Gregory, Jr. et al. |
| 6,278,533 | B1 | 8/2001 | Takemoto |
| 6,809,837 | B1 | 10/2004 | Mestha et al. |
| 2004/0165199 | A1 | 8/2004 | Klassen et al. |
| 2006/0251437 | A1 | 11/2006 | Donaldson |
| 2008/0239344 | A1 | 10/2008 | Wang et al. |
| 2009/0086292 | A1 | 4/2009 | Klassen |
| 2010/0149568 | A1* | 6/2010 | Owens .......................... 358/1.9 |

OTHER PUBLICATIONS

European Search Report, Appln. No. 10176089.0-1522/2296364, Jun. 7, 2011.
Gaurav Sharma, Digital Color Imaging Handbook, CRC Press, 2002.
Swati Bandyopadhyay, Tapan Paul, Tapasi Roychowdhury and Sivaji Bandyopadhyay, "A New Model of Printer Characterization", IS&T's NIP20: 2004 International Conference on Digital Printing Technologies.
Raja Balasubramanian, The Use of Spectral Regression in Modeling Halftone Color Printers, Journal of Electric Imaging, Apr. 1999, vol. 8(2).
Raja Balasubramanian, "Colorimetric Modeling of Binary Color Printers", pp. 1-4, Oct. 1995.
Jon Yngve Hardeberg and Francis Schmitt, "Color Printer Characterization Using a Computational Geometry Approach", (1998).
Raja Balasubramanian, A Spectral Neugebauer Model for Dot-On-Dot Printers, pp. 1-11, SPIE vol. 2413, 1995).

* cited by examiner

*Primary Examiner* — Benny Q Tieu
*Assistant Examiner* — Marcellus Augustin
(74) *Attorney, Agent, or Firm* — Fay Sharpe LLP

(57) ABSTRACT

Methods and systems are presented for characterizing a printer, display or other color reproduction device in which parametric and nonparametric forward color transforms are generated to construct a forward color device transform to characterize the mapping of CMYK input data to La*b* data of the device, with the parametric transform adapted to compensate for drifting performance of the color reproduction device.

19 Claims, 6 Drawing Sheets

METHODS AND SYSTEM FOR IMPROVED COLOR CHARACTERIZATION

BACKGROUND

The present disclosure is generally related to the field of color rendering devices such as image/text printing or display systems and to methods and systems for characterizing color output devices, such as color displays, printers and printing devices thereof. Characterization of the underlying mapping (forward transform) from a printer or display's internal device dependent color space (e.g., CMY, CMYK, RGB, etc.) to a perceived print-out color space (e.g., La*b* or other device independent color space) is important to achieving color consistency within and across color reproduction devices. In practice, this color mapping varies from device to device, and over time in a single device, due to physical conditions such as temperature, humidity, inks or other marking materials, printed media type (e.g., paper stock type, thickness), component wear and tear, and manufacturing tolerances associated with the reproduction devices. The characterization of the forward color mapping facilitates adjustments in the rendering process via control algorithms to adjust individual devices in order to achieve color consistency across product lines and over time. Conventional forward transform characterizations utilize either physics-based or data-fitting models. Physics-based modeling is based on the physical aspects of the printing/rendering device, such as the xerographic process and the half-toning pattern used, whereas data-fitting techniques measure color patches created from various CMYK values, and a mapping is created based on the input and output data values. Data-fitting models are employed by either interpolating nonparametric lookup tables or evaluating parametric analytical functions that fit the data. In general, however, the accuracy of nonparametric models is dependent upon the number of data points used in the initial characterization, and thus cost considerations may limit the extent to which a given device is characterized accurately. Moreover, adapting such models over time is cost prohibitive. Parametric modeling, which somewhat more cost effective with respect to computational overhead, is often unable to accurately characterize all aspects of a device's performance.

BRIEF DESCRIPTION

Methods and systems are provided for color reproduction device characterization in which parametric and nonparametric forward color transforms are generated to construct a forward color device transform that facilitates efficient on-going adaptation of the parametric portion representing the smooth mapping surface that drifts over time while providing accuracy through the relatively static parametric residual transform.

A color processing device is provided, which includes a rendering system, such as a series of marking devices that transfer marking material onto a printable medium or a color display that renders a visual image, according to input color data in a first color space (e.g., CMY, CMYK, etc.). The device also includes a system controller to provide the data to the rendering system according to a print job, and one or more in-line or outboard sensors (e.g., a spectral-photometer) that generate measured data in a second color space (e.g., CIE La*b* data) representing the visible image produced by the device. The color processing device further includes a characterization system that operates the rendering system so as to produce a number of visible color images according to an input data set in the first color space used for initial device characterization and receives a measured initial characterization data set representative of the color images from the sensor in the second color space. The characterization system generates a parametric forward color transform using the input and measured initial characterization data sets, and generates an estimated initial characterization data set in the second color space using the parametric forward color transform and the input data set. The characterization system generates a nonparametric forward color transform using the measured and estimated initial characterization data sets, and constructs a forward color transform for the device by combining the parametric and nonparametric forward color transforms.

The characterization system in certain embodiments adapts the nonparametric forward color transform by causing the rendering system to produce a plurality of visible adaptation images according to an input adaptation data set and receives a measured adaptation data set representing the adaptation images in the second color space. The parametric forward color transform is then adapted using the input adaptation data set and the measured adaptation data set, such as by fitting a polynomial surface to the adaptation data.

A method is provided for characterizing a color reproduction device. The method includes producing a plurality of visible color images according to an input initial characterization data set using the color reproduction device, measuring the color images to generate a measured initial characterization data set, and generating a parametric forward color transform using the input initial characterization data set and the measured initial characterization data set, such as by fitting a polynomial surface to the initial characterization data. The method further includes generating an estimated initial characterization data set using the parametric forward color transform and the input initial characterization data set. This may include evaluating the input initial characterization data set using the parametric forward color transform to generate the estimated initial characterization data set. The method also includes generating a nonparametric forward color transform using the measured and estimated initial characterization data sets, such as by subtracting the estimated initial characterization data set values from the measured initial characterization data set values to determine residual difference values. The method further provides for constructing a forward color transform for the device by combining the parametric and nonparametric forward color transforms, such as a summation of the parametric and interpolated nonparametric forward color transforms. Embodiments of the method may also involve adapting the nonparametric forward color transform, for example, by producing a plurality of visible adaptation images according to an input adaptation data set in the first color space, measuring the adaptation images to generate a measured adaptation data set in the second color space, and adapting the parametric forward color transform using the input adaptation data set and the measured adaptation data set, such as by fitting a polynomial surface to the adaptation data.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
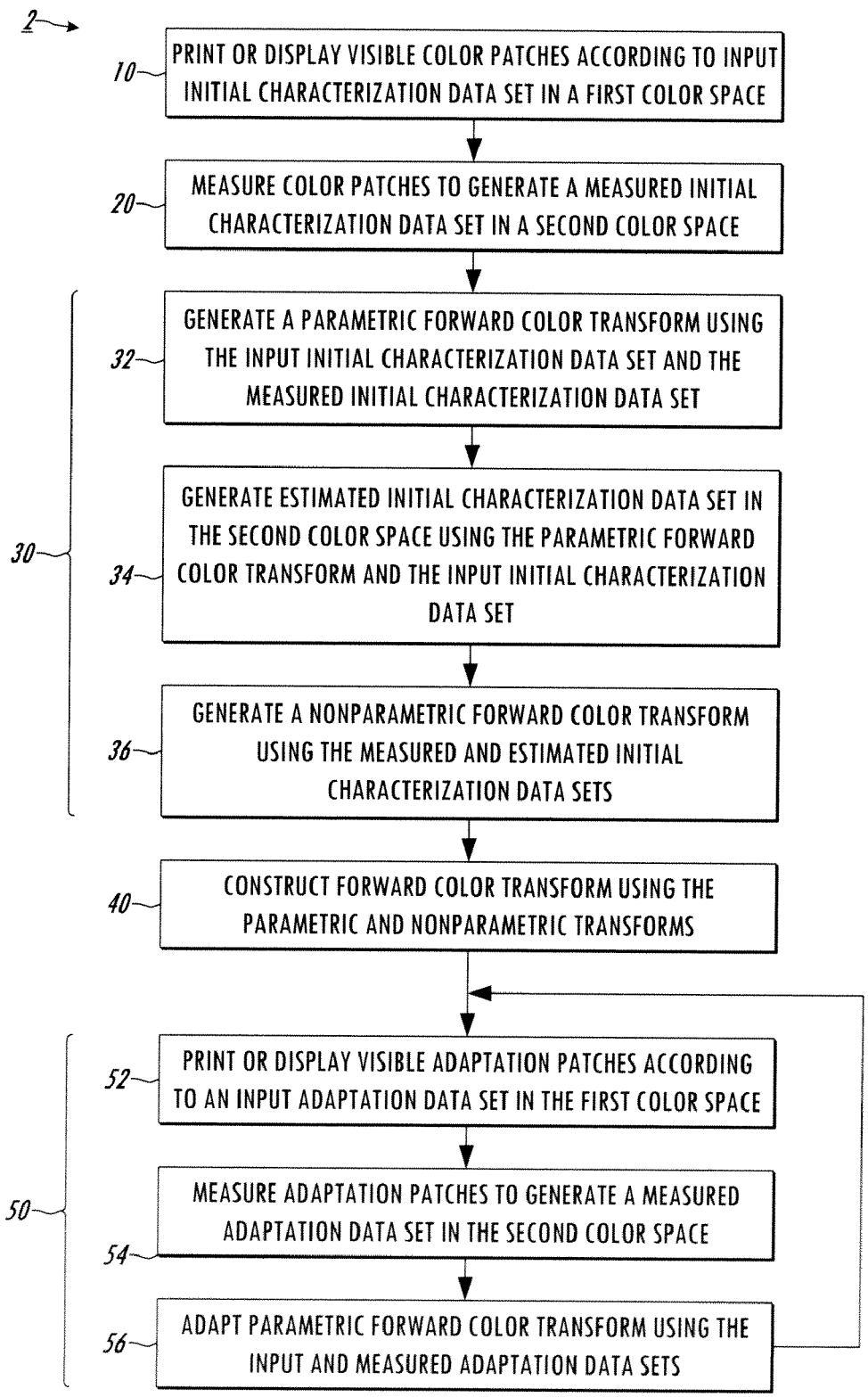
FIG. 1 is a flow diagram illustrating an exemplary method for characterizing a color reproduction device in accordance with the present disclosure.

Referring now to the drawings, the present disclosure provides for decomposition of a forward device color mapping surface into a smooth surface represented as a parametric model, such as a low order polynomial regression in one example, as well as a high-frequency residual, for example, represented as a lookup table for interpolation of the fine features of the mapping. The inventors have appreciated that the component transform parts are influenced by different aspects of the printing physics and have different time evolution properties. In particular, the inventors have recognized the smooth surface of the device mapping modeled in parametric fashion varies over time whereas the residual portion represented in nonparametric form remains generally static. Decomposition of the device forward transform into parametric and nonparametric components facilitates achieving estimation accuracy comparable to conventional data-fitting techniques, together with computational efficiency and a significantly smaller number of data samples in the color space for adaptation. In addition, the technique yields robustness to noise and varying printing conditions. The device characterization systems and methods of the disclosure are illustrated and described below in the context of exemplary printing systems having marking stations for application of marking material (e.g., ink, toner, etc.) to printable media, as well as display devices that render visible images on a display screen, although the characterization concepts of the present disclosure may be applied to any type of color reproduction device capable of producing visible images.

Figure 2:
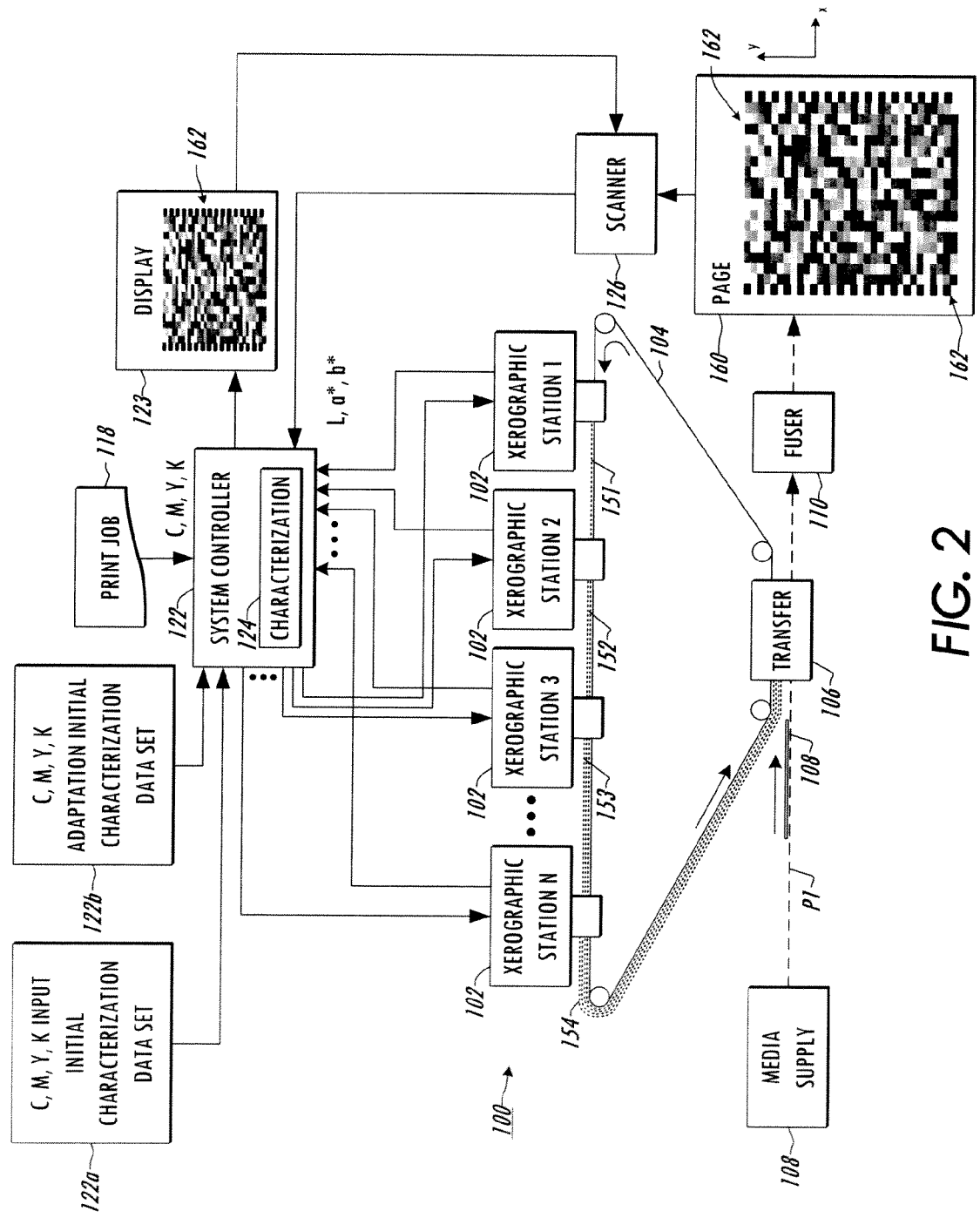
FIG. 2 is a simplified schematic system level diagram illustrating an exemplary multi-color document processing system in accordance with several aspects of the disclosure.
Figure 3:
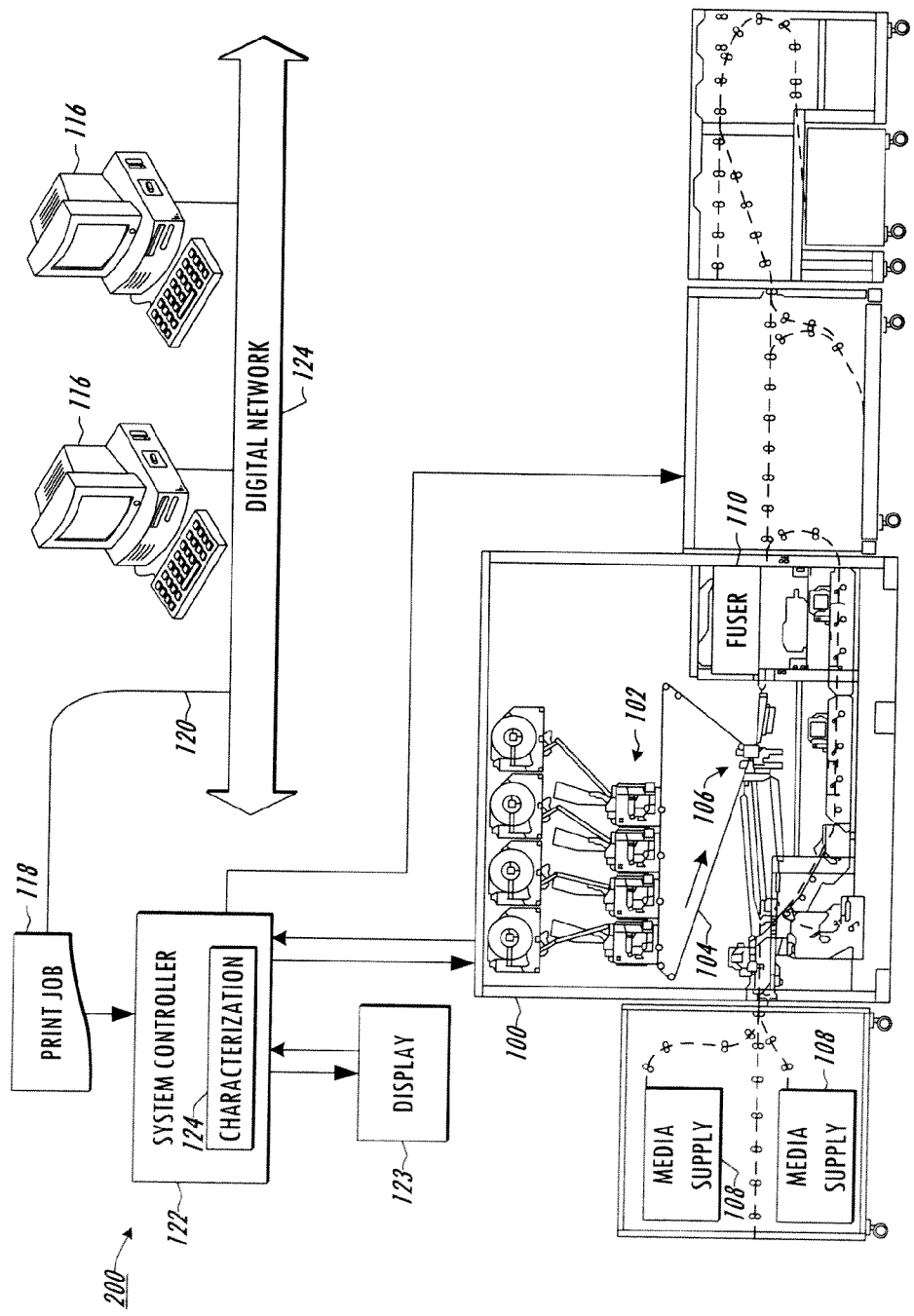
FIG. 3 is a detailed side elevation view illustrating an exemplary embodiment of the system of FIG. 2 in accordance with the present disclosure.
Figure 5:
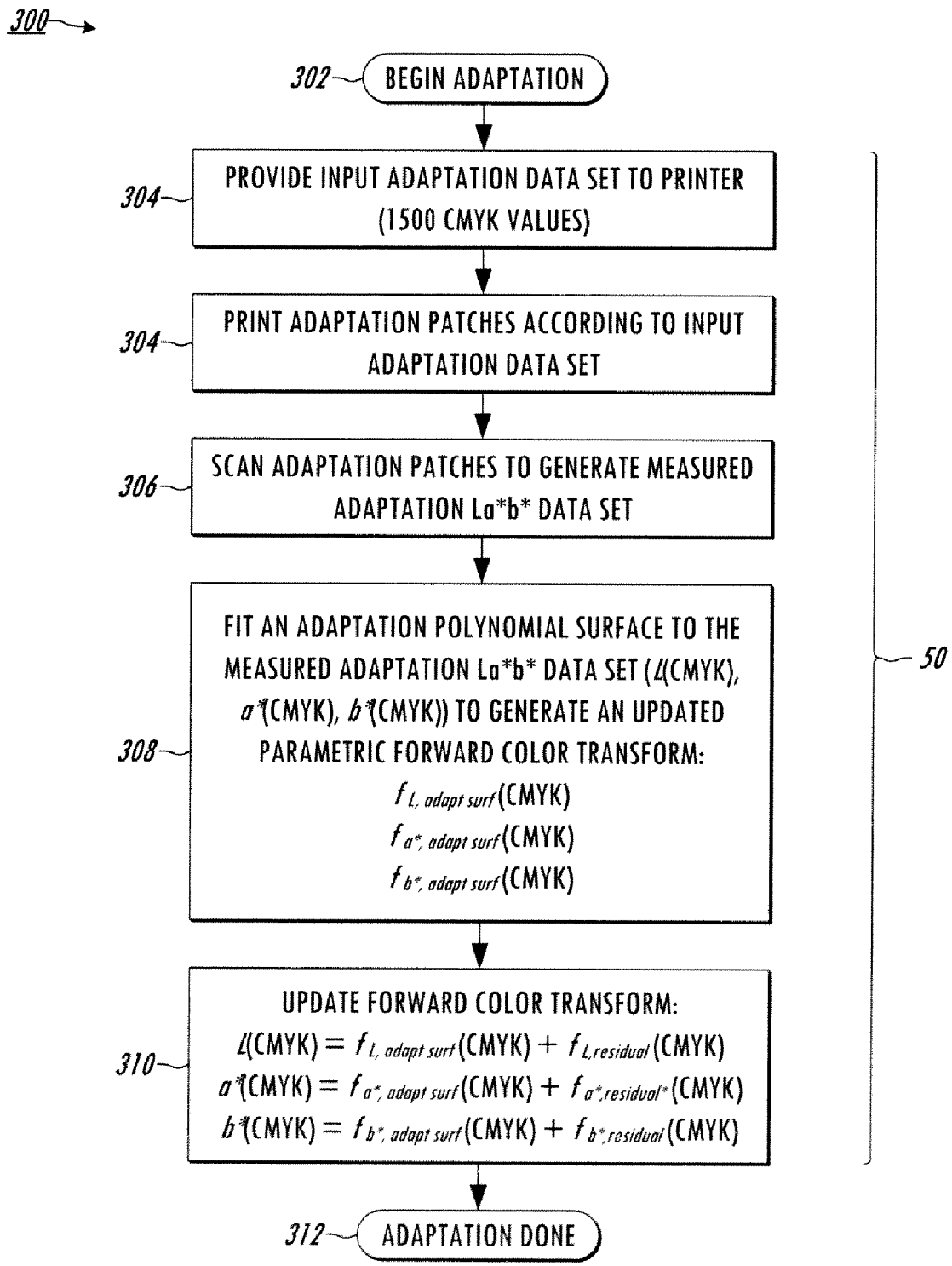
FIG. 5 is a flow diagram illustrating an exemplary color printer characterization adaptation embodiment of the present disclosure.
Figure 6:
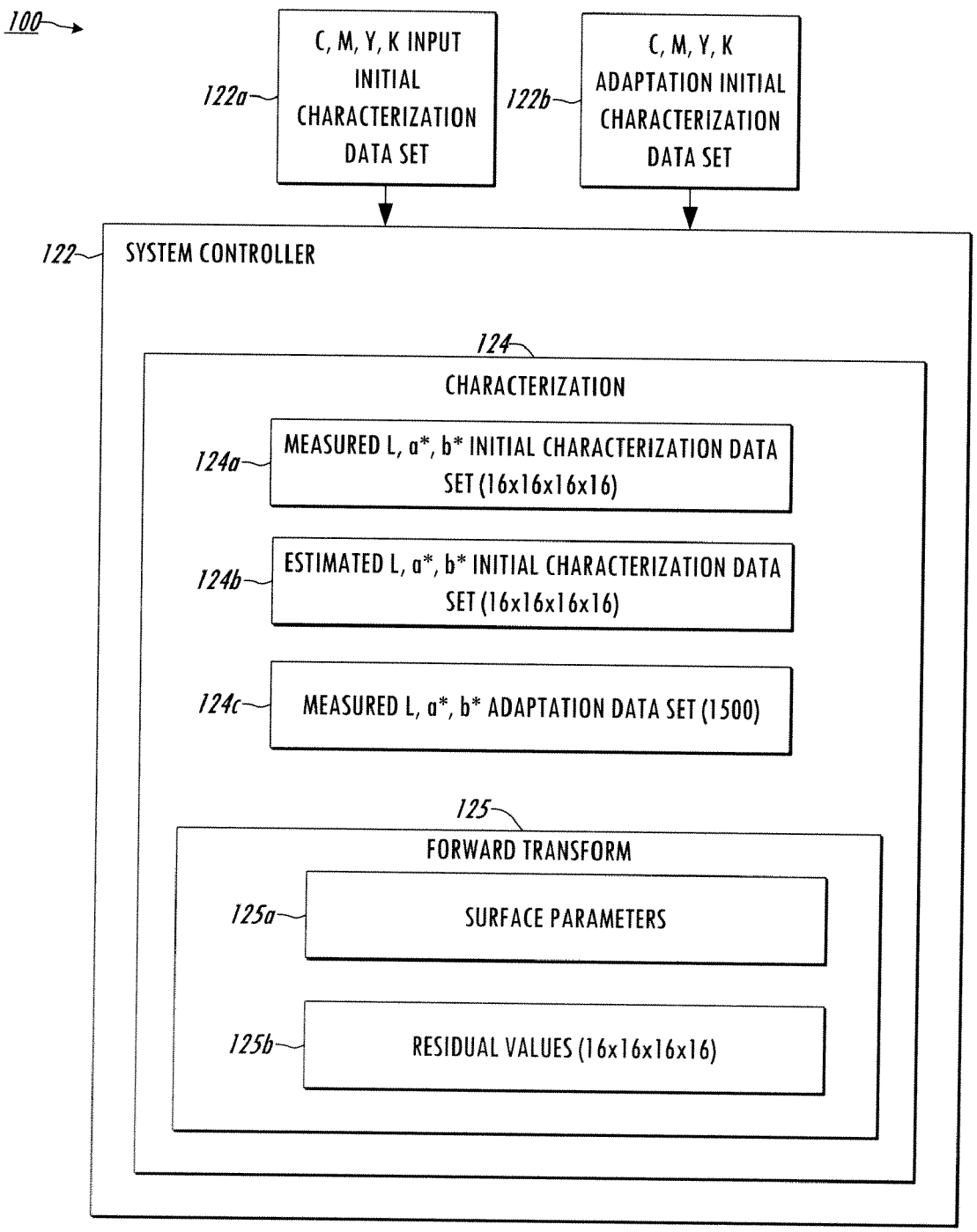
FIG. 6 is a schematic diagram illustrating further details of the characterization system in the embodiments of FIGS. 2 and 3.

FIG. 1 illustrates an exemplary method 2 for characterizing a color reproduction device, and FIGS. 2, 3, and 6 depict exemplary printing systems or devices 100 with system controllers 122 and characterization systems 124 in which the method 2 may be implemented. While the exemplary method 2 of FIG. 1 and the processes 200, 300 in FIGS. 4 and 5 below are illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods 2, 200, 300 and other methods of the disclosure may be implemented in hardware, processor executed software, or combinations thereof, whether in a single characterization system or in distributed form in two or more components or systems, in order to characterize a color printing device, color display or other color reproduction device, and may be employed in any form of printing system including without limitation desktop printers, computers, network printers, stand-alone copiers, multi-function printer/copier/facsimile devices, high-speed printing/publishing systems and digital printing presses, digital cameras, etc. wherein the disclosure is not limited to the specific applications and implementations illustrated and described herein.

Referring to FIGS. 1 and 6, the method 2 begins at 10 in FIG. 1, where a plurality of visible color images 162 are produced (e.g., color patches 162 printed onto page(s) 160 or rendered on a display 123 in FIG. 2) according to an input initial characterization data set 122$a$ (FIG. 6) using a color reproduction device 100, 123 (FIGS. 2 and 3). In one embodiment, the data set 122$a$ is C,M,Y,K data representing given amounts of Cyan, Magenta, Yellow, and black (K), although different embodiments can utilize other device dependent color data that constitute an internal representation of color for the specific device 100. At 20, the color images 162 are measured (e.g., using a scanner 126 in FIG. 2) to generate a measured initial characterization data set 124$a$ (FIG. 6). In the illustrated examples, the scanner 126 senses the visible patch images 162 of the printed page(s) 160 or the images 162 rendered on the display 123 and generates corresponding L, a*, and b* data values in a CIE (Commission Internationale de L'eclairage) color space in which L defines lightness, a* corresponds to a red/green value, and b* denotes the amount of yellow/blue, although other measured color data may be generated by the sensor in other second color spaces which include values representing the physical appearance of the spectral content of the generated images as perceived by human viewers in other embodiments.

At 30 in FIG. 1, the input initial characterization data set 122$a$ and the measured initial characterization data set 124$a$ are used to provide two mappings of the color reproduction performance of the device 100. At 32, a parametric forward color transform 125$a$ is generated using the input initial characterization data set 122$a$ and the measured initial characterization data set 124$a$. In one embodiment, this is accomplished by fitting a second or third-order polynomial surface to the initial data set, wherein the transform generation at 32 yields a number of polynomial parameters or coefficients 125$a$ (FIG. 6) that are stored in the characterization system 125. Once the parameters are established, mapping a given C,M,Y,K value in the first color space to a predicted L,a*,b* value in the second color space can be done by evaluating the corresponding polynomials for the L, a*, and b* values using the coefficient parameters 125$a$ generated at 32.

At 34, an estimated initial characterization data set 124$b$ is generated using the parametric forward color transform 125$a$ and the input initial characterization data set 122$a$. In one embodiment, this is done by evaluating values of the input initial characterization data set 122$a$ using the parametric forward color transform 125$a$ to generate the estimated initial characterization data set 124$b$. A nonparametric forward color transform 125$b$ (FIG. 6) is generated at 36 using the measured and estimated device independent color values in the second color space for the initial color characterization set 122$a$ and 124$a$. This may be done, for example, by subtracting the estimated initial characterization data set values 124$b$ from the measured initial characterization data set values 124$a$ to determine residual difference values. The forward color transform 125 for the device 100 is then constructed at 40 using the parametric and nonparametric forward color transforms 125$a$ and 125$b$. In one embodiment, the forward color transform 125 for the device 100 is constructed at 40 as a summation of the parametric and interpolated nonparametric forward color transforms 125a, 125b.

Certain embodiments of the process 2 may also provide for adapting the nonparametric forward color transform 125a at 50 in FIG. 1. In this regard, the selective decomposition into the parametric and nonparametric components 125a and 125b, respectively, provides for efficient updating or adaptation of only the smooth surface parametric component transform 125a to accommodate device performance drifts over time. At 52, a plurality of visible adaptation images 162 are produced at 52 according to an input adaptation data set 122b in the first color space (FIGS. 2 and 6) using the color reproduction device 100. As with the initial color characterization, the adaptation images may be printed as color patches (e.g., patches 162) on a printed sheet or may be rendered on the display 123. The visual adaptation images 162 are then measured at 54 (e.g., via scanner 126) to generate a measured adaptation data set 124c in the second color space (FIG. 6), and the parametric forward color transform 125a is adapted or modified at 56 using the input and measured adaptation data sets 122b and 124c, such as by adjusting the polynomial surface based on the adaptation data. In a preferable implementation, the scanner 126 or other measurement means is an in-line apparatus integrated into the device being characterized and the adaptation process 50 may be automated to run without user intervention.

Referring now to FIGS. 2, 3, and 6, the exemplary color processing device 100 includes a rendering system with xerographic stations 102 and a display 123, either or both of which operate to produce visible images according to input color data in the first space. The device 100 further includes a system controller 122 which provides input color data (e.g., C,M,Y,K) to the rendering system 102, 123 according to a print job 118, as well as a scanner type sensor 126 that generates (e.g., L,a*,b*) data 124a, 124c representative of the printed or displayed visible images 162 in the second space. The scanner 126 in certain embodiments may be integrated into the rendering system for in-line scanning of printed images 162 on pages 160. FIG. 2 illustrates an exemplary tandem multi-color document processing system 100, where the marking devices 102 are individually operable according to control signals or data from the controller 122 to transfer toner marking material 151-153 onto an intermediate substrate 104 that may or may not be a photoreceptor, in this case, a shared intermediate transfer belt (ITB) 104 traveling in a counter clockwise direction in the figure past the xerographic marking devices 102, also referred to as marking engines, marking elements, marking stations, etc. In other embodiments, a cylindrical drum may be employed as an intermediate transfer substrate, with the marking devices 102 positioned around the periphery of the drum to selectively transfer marking material thereto.

FIG. 3 depicts a system 100 having four marking devices 102 configured along a shared or common intermediate transfer belt 104. This figure shows an exemplary printing environment or system 200 including an embodiment of the above-described document processing system 100 having marking stations 102 along with a transfer station 106, a supply of final print media 108, and a fuser 110 as described in FIG. 2 above. In normal operation, print jobs 118 are received at the controller 122 via an internal source such as an in-line or outboard scanner 126 (FIG. 2) and/or from an external source, such as one or more computers 116 connected to the system 100 via one or more networks 124 and associated cabling 120, or from wireless sources. The print job execution may include printing selected text, line graphics, images, magnetic ink character recognition (MICR) notation, etc., on the front and/or back sides or pages of one or more sheets of paper or other printable media 108. In this regard, some sheets 108 may be left completely blank in accordance with a particular print job 118, and some sheets may have mixed color and black-and-white printing. Execution of the print job 118, moreover, may include collating the finished sheets 108 in a certain order, along with specified folding, stapling, punching holes into, or otherwise physically manipulating or binding the sheets 108. In certain embodiments the system 200 may be a stand-alone printer or a cluster of networked or otherwise logically interconnected printers, with each printer having its own associated print media source 108 and finishing components including a plurality of final media destinations, print consumable supply systems and other suitable components. Alternatively the system may include multiple marking engines 102 with a common media supply 108 and common finishers that are configured either serially or in parallel (separate parallel paper paths between feeding and finishing).

The system 100 in FIGS. 2, 3, and 6 includes a characterization system 124 that is operatively coupled with (and may be implemented integrally to) the system controller 122. In one exemplary embodiment, the characterization system 124 is implemented as a processor-based system having suitable processing and memory components programmed or configured to implement the characterization process 2 and other functionality as described herein. The characterization system 124 may be operated generally according to the process 2 above to cause the rendering system 102, 123 to produce a plurality of visible color images 162 according to an input initial characterization data set 122a in a first color space. The system 124 receives a measured initial characterization data set 124a in a second color space representative of the color images 162 from the sensor 126, and generates the parametric forward color transform 125a using the input initial characterization data set 122a and the measured initial characterization data set 124a. The system 124 generates the estimated initial characterization data set 124b using the parametric transform 125a and the input initial characterization data set 122a, for example, by evaluating the values of the input initial characterization data set 122a using the parametric forward color transform 125a. The system 124 then generates the nonparametric forward color transform 125b using the measured and estimated initial characterization data sets 122a, 124a, and constructs the forward color transform 125 for the device 100 using the parametric and nonparametric forward color transforms 125a and 125b. Thereafter, the characterization system 124 adapts the nonparametric forward color transform 125a to compensate for drift effects in the system 100, such as during startup processing, periodically, or at other intervals in automated and/or user-initiated fashion.

Figure 4:
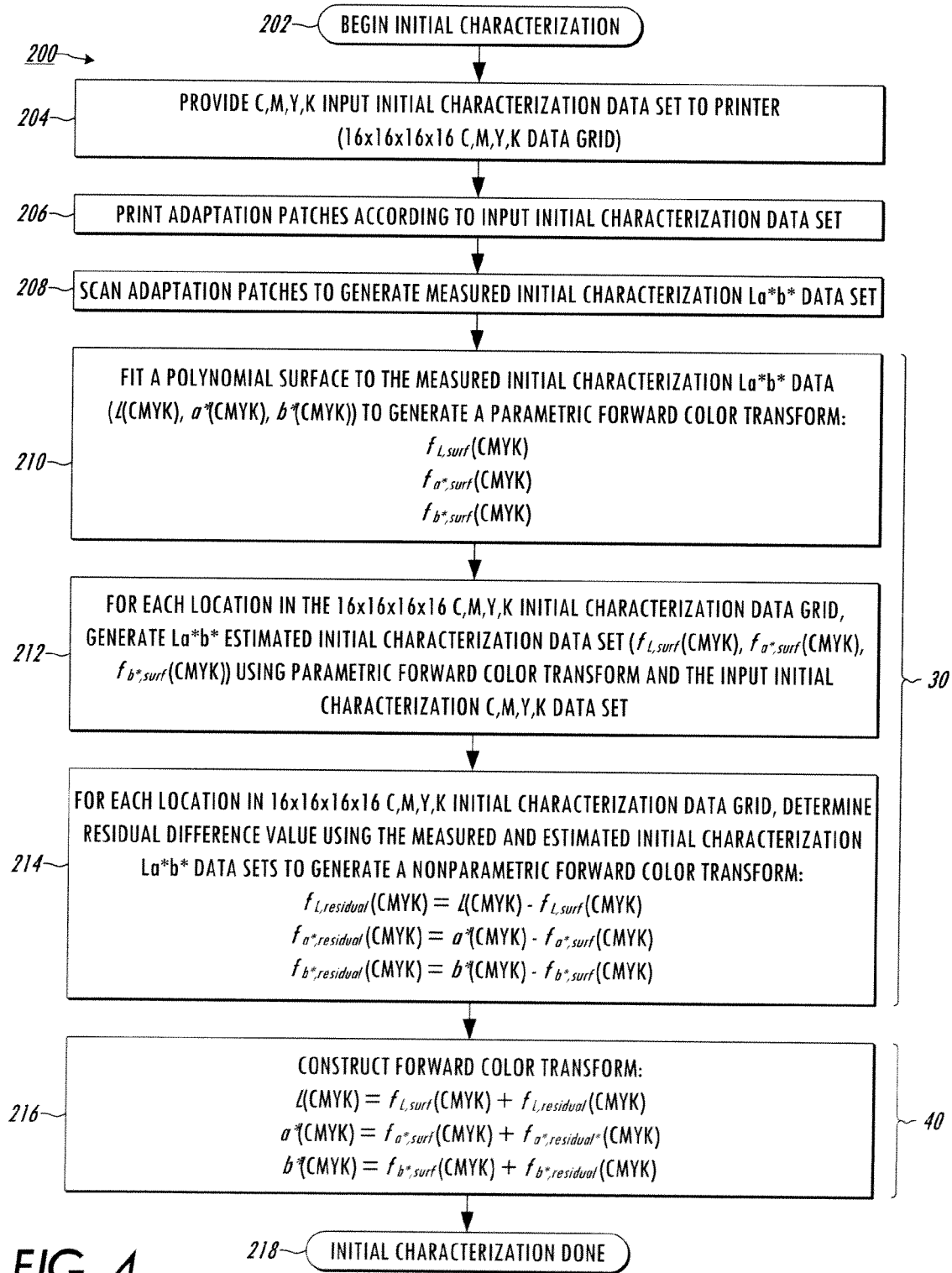
FIG. 4 is a flow diagram illustrating a color printer device characterization embodiment of the present disclosure.

Referring now to FIGS. 4 and 5, a detailed implementation of a characterization process 200 and a corresponding adaptation process 300 are hereinafter described in the context of color printer characterization in the system 100. The color reproduction performance of the system 100 is characterized in this case as a mapping from the four-dimensional C,M,Y,K first color space representation of the input data to a three-dimensional L,a*,b* representation of the perceivable spectral content of generated images in a second (device independent) CIE color space, and thus involves formation of three functions, one for each of the second color space values, i.e., the estimated color (L, a*, b*)=($f_L$(C,M,Y,K), $f_{a*}$(C,M,Y,K), $f_{b*}$(C,M,Y,K). The system controller 122 in certain embodiments is configured to use this forward transformation to derive an inverse transform by which the input data from print jobs 118 can be modified such that the output images (printed or displayed) are consistent when viewed by users across different printers and over time. The decomposition of the forward transform 125 into two elements (parametric 125a and nonparametric 125b in FIG. 6) advantageously facilitates scalability so that the transform does not require a huge number of training samples as well as computational efficiency allowing quick calibration and easy adaptation, robustness against noise and robustness against printing condition variations.

The partition decomposes the overall mapping 125 ($f_L$, $f_{a*}$, or $f_{b*}$) into low-frequency and high-frequency components 125a, 125b, where the low-frequency part 125a is a smooth surface which can be modeled using a parametric function by parametric estimation or other data-fitting techniques. The high-frequency component 125b is modeled using a more flexible nonparametric representation. With respect to printing systems generally, the inventors have appreciated that the two components of the transform represent different aspects and exhibit different time-evolution patterns. The smooth surface represented by the parametric transform 125a is related to the internal operating conditions of the color reproduction device, such as temperature, toner mass-charge ratio, and other physical characteristics that vary over time. Consequently, the modeled smooth surface $f_{surf}$ (transform 125a) drifts slowly, and is therefore advantageously adapted over time in certain embodiments of the characterization system 124. The fine-level details of the non-parametric transform $f_{residual}$ (transform 125b), on the other hand, are largely a function of printer design and external factors such as halftone patterns and printing media 108 (e.g., glossy paper vs. flat paper, heavy-weight vs. regular paper), and thus remain generally static. The system 124 constructs the residual transform $f_{residual}$ 125b for representative external conditions. Consequently, the two-part separation allows a computationally efficient adaptation scheme in which $f_{surf}$ 125a and $f_{residual}$ 125b are adapted separately or differently over time. In this regard, the nonparametric transform $f_{residual}$ 125b is initially more expensive to construct, but does not require subsequent adaptation because it is static, whereas the low-frequency parametric transform $f_{surf}$ 125a drifts over time, and is therefore advantageously adapted from time to time, but the adaptation is quick and low-cost, because the transform $f_{surf}$ 124a is modeled as a polynomial surface with relatively few parameters. This allows frequent update of the surface, e.g., once per day or even per hour, or during startup, etc.

The process 200 in FIG. 4 illustrates the initial device characterization beginning at 202, in which a C,M,Y,K input initial characterization data set 122a is provided at 204. In one example for an 8-bit C,M,Y,K space, the data set 122a is homogeneously sampled with respect to a regular 16×16×16×16 grid in the first color space, in which each of the C,M,Y,K dimensions is a uniform 16-level grid taking values in the range from 0 to 255. Color patches (e.g., patches 162 on page(s) 160 in FIG. 2) are then printed at 206 according to the input initial characterization data set 122a. The color patches 162 are then scanned at 208 to generate the measured initial characterization La*b* data set 124a. From the input initial characterization C,M,Y,K data set 122a and the measured initial characterization La*b* data set 124a, the characterization system 124 constructs $f_{surf}$ 125a at 210 by fitting a $2^{nd}$ or $3^{rd}$ order polynomial surface to the data, although any order of parametric fitting may be employed. In one implementation, fitting a smooth surface to obtain the parametric transform $f_{surf}$ 125a is done via regression. For instance, a $2^{nd}$ order surface over the four-dimensional C,M,Y,K space is parameterized by 15 parameters 125a, and a $3^{rd}$ order surface has 45 parameters 125a. With the estimated parameters 125a ($f_{surf}$(C,M,Y,K) specified), the system 124 can evaluate the estimated surface value for any given CMYK input. The parametric forward color transform 125a in this example is $f_{L,surf}$(CMYK); $f_{a*,surf}$(CMYK); and $f_{b*,surf}$(CMYK).

At 212 in FIG. 4, the characterization system 124 generates estimated La*b* data values for each location in the 16×16×16×16 grid of the C,M,Y,K first color space by evaluating parametric forward color transform 125a for each data value of the input initial characterization C,M,Y,K data set 122a to generate the estimated initial characterization set 124b (FIG. 6). At 214, the system 124 computes the difference between the measured and estimated La*b* values to generate the nonparametric forward color transform 125b:

$$f_{L,residual}(CMYK)=L(CMYK)-f_{L,surf}(CMYK);$$

$$f_{a*,residual}(CMYK)=a*(CMYK)-f_{a*,surf}(CMYK); \text{ and}$$

$$f_{b*,residual}(CMYK)=b*(CMYK)-f_{b*,surf}(CMYK).$$

The nonparametric transform $f_{residual}$ 125b in one embodiment is evaluated via nonparametric interpolation. In this case, for the CMYK values of the 16-level grid set, a residual value is stored in a lookup table of the transform 125b. For any CMYK value not on the grid, a distance-averaged interpolation technique is employed in this embodiment to evaluate $f_{residual}$ to find its immediate neighbors in the input initial characterization set and their corresponding residual La*b* values. Next, the system 124 computes a weighted average of the neighbors' La*b* values according to the following formula:

$$f_{residual}(C,M,Y,K) = \sum_{i \in N} \alpha_i f_{residual}(i),$$

where N is the neighborhood in the core set CMYK space, and $f_{residual}(i)$ is the residual value of the neighboring point that can be looked up from the data set. Each neighbor i is weighted by a weight $\alpha i$, set to be proportional to the inverse distance to the neighbors in the CMYK space. In this manner, a neighbor point closer in the CMYK space is given a heavier weight than the neighbors further away. The weighted average is then taken to be the predicted value of the La*b* residual. This grid-based residual representation 125b is then stored in the system 124 and remains static.

The characterization system 124 then constructs the forward transform 125 at 216 as the summation of the functions for each transform 125a, 125b for each of the device independent color space L,a*,b*:

$$L(CMYK)=f_{L,surf}(CMYK)+f_{L,residual}(CMYK);$$

$$a*(CMYK)=f_{a*,surf}(CMYK)+f_{a*,residual*}(CMYK); \text{ and}$$

$$b*(CMYK)=f_{b*,surf}(CMYK)+f_{b*,residual}(CMYK)$$

where the residual function $f_{residual}$ is evaluated as a lookup table for points on the grid and is evaluated by interpolation for points off the grid. The initial device characterization is thus completed at 216. It is noted that the onboard characterization system 124 may perform some or all of the initial characterization tasks as described above, or some or all these tasks may be performed by an external system.

FIG. 5 illustrates exemplary adaptation processing 300 by the characterization system 124 beginning at 302. In practice, the adaptation can be performed on each individual device 100 once every day during cycle-up time, or during customer printing jobs to obtain the adaptation set, preferably via an onboard characterization system 124 without requiring user intervention. The system 124 is provided with a C,M,Y,K input adaptation data set 122b at 304 for updating/adapting the parametric transform 125a ($f_{L,surf}$, $f_{a^*,surf}$, $f_{b^*,surf}$) for each individual color reproduction device 100. The input adaptation data set 122b is used to print adaptation patches at 304 (e.g., patch images 162 in FIG. 2), and these are scanned at 306 (using scanner 126) to generate a measured La*b* adaptation data set 124c (FIG. 6). The C,M,Y,K input adaptation data set 122b and the corresponding measured La*b* adaptation data set 124c (e.g., around 1500 values for each in one embodiment) are then fitted at 308 to generate an updated parametric forward color transform $f_{La^*b^*,\,adapt\,surf}$(CMYK) 125a=($f_{L,\,adapt\,surf}$(CMYK); $f_{a^*,\,adapt\,surf}$(CMYK); and $f_{b^*,\,adapt\,surf}$(CMYK). The overall forward transform (La*b*(CMYK)) 125 is updated at 310:

$$L(CMYK)=f_{L,adapt\,surf}(CMYK)+f_{L,residual}(CMYK);$$

$$a^*(CMYK)=f_{a^*,adapt\,surf}(CMYK)+f_{a^*,residual}(CMYK);\text{ and}$$

$$b^*(CMYK)=f_{b^*,adapt\,surf}(CMYK)+f_{b^*,residual}(CMYK).$$

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method of characterizing a color reproduction device, the method comprising:
producing a plurality of visible color images using the color reproduction device according to an input initial characterization data set in a first color space;
measuring the color images to generate a measured initial characterization data set in a second color space;
using at least one processor, generating a parametric forward color transform mapping color from the first color space to the second color space using the input initial characterization data set and the measured initial characterization data set;
using the at least one processor, generating an estimated initial characterization data set using the parametric forward color transform and the input initial characterization data set;
using the at least one processor, generating a nonparametric forward color transform mapping color from the first color space to the second color space using the measured and estimated initial characterization data sets; and
using the at least one processor, constructing a forward color transform for the device using the parametric and nonparametric forward color transforms.

2. The method of claim 1, wherein producing the plurality of visible color images comprises printing a plurality of visible color patches using a printer, and wherein measuring the color images comprises scanning the printed color patches to generate the measured initial characterization data set.

3. The method of claim 1, wherein producing the plurality of visible color images comprises rendering a plurality of visible color patches on a display.

4. The method of claim 1, wherein the input initial characterization data set is a four-dimensional data set with C, M, Y, and K values in the first color space, and wherein the measured and estimated initial characterization data sets are three-dimensional data sets with L, a*, and b* values in the second color space.

5. The method of claim 1, wherein generating the parametric forward color transform comprises fitting a polynomial surface to the initial characterization data.

6. The method of claim 1, wherein generating the estimated initial characterization data set comprises evaluating values of the input initial characterization data set using the parametric forward color transform to generate the estimated initial characterization data set, and wherein generating the nonparametric forward color transform comprises subtracting the estimated initial characterization data set values from the measured initial characterization data set values to determine residual difference values.

7. The method of claim 1, wherein the forward color transform for the device is constructed as a summation of the parametric and interpolated nonparametric forward color transforms.

8. The method of claim 1, further comprising adapting the nonparametric forward color transform.

9. The method of claim 8, wherein adapting the nonparametric forward color transform comprises:
producing a plurality of visible adaptation images using the color reproduction device according to an input adaptation data set in the first color space;
measuring the adaptation images to generate a measured adaptation data set in the second color space; and
adapting the parametric forward color transform using the input adaptation data set and the measured adaptation data set.

10. The method of claim 9, wherein producing the plurality of visible adaptation images comprises printing a plurality of visible adaptation patches using a printer according to the input adaptation data set, and wherein measuring the adaptation images comprises scanning the printed adaptation patches using an in-line scanner of the printer to generate the measured adaptation data set.

11. The method of claim 9, wherein adapting the parametric forward color transform comprises fitting a polynomial surface to the adaptation data.

12. The method of claim 1, wherein the input initial characterization data set is homogeneously sampled with respect to a regular grid in the first color space.

13. A color processing device, comprising:
- a rendering system operative to produce a visible image according to input color data in a first color space;
- a system controller operative to provide the input color data to the rendering system according to a print job;
- a sensor operative to generate measured data in a second color space representative of the visible image; and
- a characterization system coupled with the system controller and the sensor and operative to cause the rendering system to produce a plurality of visible color images according to an input initial characterization data set, to receive a measured initial characterization data set representative of the color images from the sensor, to generate a parametric forward color transform using the input initial characterization data set and the measured initial characterization data set, to generate an estimated initial characterization data set using the parametric forward color transform and the input initial characterization data set, to generate a nonparametric forward color transform using the measured and estimated initial characterization data sets, and to construct a forward color transform for the device using the parametric and nonparametric forward color transforms.

14. The color processing device of claim 13, wherein the rendering system comprises a plurality of marking devices operative according to the input initial characterization color data to transfer marking material onto a corresponding medium to create visible color images on the medium, and wherein the sensor is a scanner operative to scan the medium and to generate measured initial characterization data representative of the printed visible color images.

15. The color processing device of claim 14, wherein the characterization system is operative to adapt the nonparametric forward color transform.

16. The color processing device of claim 15, wherein the characterization system is operative to cause the rendering system to produce a plurality of visible adaptation images on the medium according to an input adaptation data set in the first color space, to receive a measured adaptation data set representative of the adaptation images from the scanner in the second color space, and to adapt the parametric forward color transform using the input adaptation data set and the measured adaptation data set.

17. The color processing device of claim 16, wherein the scanner is integrated into the rendering system.

18. The color processing device of claim 16, wherein the characterization system is operative to fit a polynomial surface to the adaptation data to adapt the parametric forward color transform.

19. The color processing device of claim 13, wherein the rendering system comprises a display.

\* \* \* \* \*